(12) United States Patent
Niwa

(10) Patent No.: US 12,351,165 B2
(45) Date of Patent: Jul. 8, 2025

(54) VEHICLE SYSTEM FOR DETECTING LEVEL DIFFERENCES AND IMPLEMENTING OVERRIDE CONTROL MECHANISMS

(71) Applicant: SUBARU CORPORATION, Tokyo (JP)

(72) Inventor: Hitoshi Niwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 276 days.

(21) Appl. No.: 17/947,655

(22) Filed: Sep. 19, 2022

(65) Prior Publication Data

US 2023/0100646 A1 Mar. 30, 2023

(30) Foreign Application Priority Data

Sep. 29, 2021 (JP) .................................. 2021-159665

(51) Int. Cl.
*B60W 30/09* (2012.01)
*B60W 10/04* (2006.01)
*B60W 10/18* (2012.01)

(52) U.S. Cl.
CPC ............ *B60W 30/09* (2013.01); *B60W 10/04* (2013.01); *B60W 10/18* (2013.01); *B60W 2422/70* (2013.01); *B60W 2520/06* (2013.01); *B60W 2530/10* (2013.01); *B60W 2540/10* (2013.01); *B60W 2554/20* (2020.02); *B60W 2710/0666* (2013.01); *B60W 2710/182* (2013.01)

(58) Field of Classification Search
None
See application file for complete search history.

(56) References Cited

U.S. PATENT DOCUMENTS

| | | | |
|---|---|---|---|
| 2016/0102622 A1* | 4/2016 | Crombez | G01L 5/22 701/51 |
| 2016/0325748 A1* | 11/2016 | Mori | B60W 10/08 |
| 2018/0118213 A1* | 5/2018 | Stoffels | B60W 10/06 |
| 2020/0361464 A1 | 11/2020 | Noguchi | |
| 2021/0039640 A1* | 2/2021 | Jakobsson | B60W 30/146 |
| 2021/0179107 A1* | 6/2021 | Son | B60W 30/18063 |

FOREIGN PATENT DOCUMENTS

| | | |
|---|---|---|
| JP | 2006-96191 A | 4/2006 |
| JP | 2014-091351 A | 5/2014 |
| JP | 2015-009599 A | 1/2015 |
| JP | 2019-093761 A | 6/2019 |
| JP | 2020-082885 A | 6/2020 |

OTHER PUBLICATIONS

Office Action issued in Japanese Patent Application No. 2021-159665 dated Jun. 3, 2025. (including machine translation).

* cited by examiner

*Primary Examiner* — Amelia Vorce
(74) *Attorney, Agent, or Firm* — TROUTMAN PEPPER LOCKE LLP

(57) ABSTRACT

A vehicle includes a level difference detector and a running controller. The level difference detector is configured to detect a level difference. The running controller is configured to perform in parallel level-difference override suppression control to suppress erroneous start for override of the level difference and level-difference override support control to support override of the level difference.

16 Claims, 5 Drawing Sheets

VEHICLE SYSTEM FOR DETECTING LEVEL DIFFERENCES AND IMPLEMENTING OVERRIDE CONTROL MECHANISMS

CROSS-REFERENCE TO RELATED APPLICATION

The present application claims priority from Japanese Patent Application No. 2021-159665 filed on Sep. 29, 2021, the entire contents of which are hereby incorporated by reference.

BACKGROUND

The disclosure relates to a technical field of vehicles.

A vehicle is proposed, which determines that a wheel is in contact with a car stop member if the amount of increase in the power in the front-back direction with which the wheel is stopped exceeds a threshold value and the magnitude of the power in the front-back direction with which the wheel is stopped exceeds a predetermined value (for example, refer to Japanese Unexamined Patent Application Publication No. 2006-96191).

SUMMARY

An aspect of the disclosure provides a vehicle comprising a level difference detector and a running controller. The level difference detector is configured to detect a level difference. The running controller is configured to perform in parallel level-difference override suppression control to suppress erroneous start for override of the level difference and level-difference override support control to support override of the level difference.

An aspect of the disclosure provides a vehicle comprising circuitry. The circuitry is configured to detect a level difference. The circuitry is configured to perform in parallel level-difference override suppression control to suppress erroneous start for override of the level difference and level-difference override support control to support override of the level difference.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Vehicles desirably perform control appropriate for a user's operation after a wheel is in contact with a level difference, such as a car stop member.

It is desirable to perform control reflecting a user's operation against a level difference.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
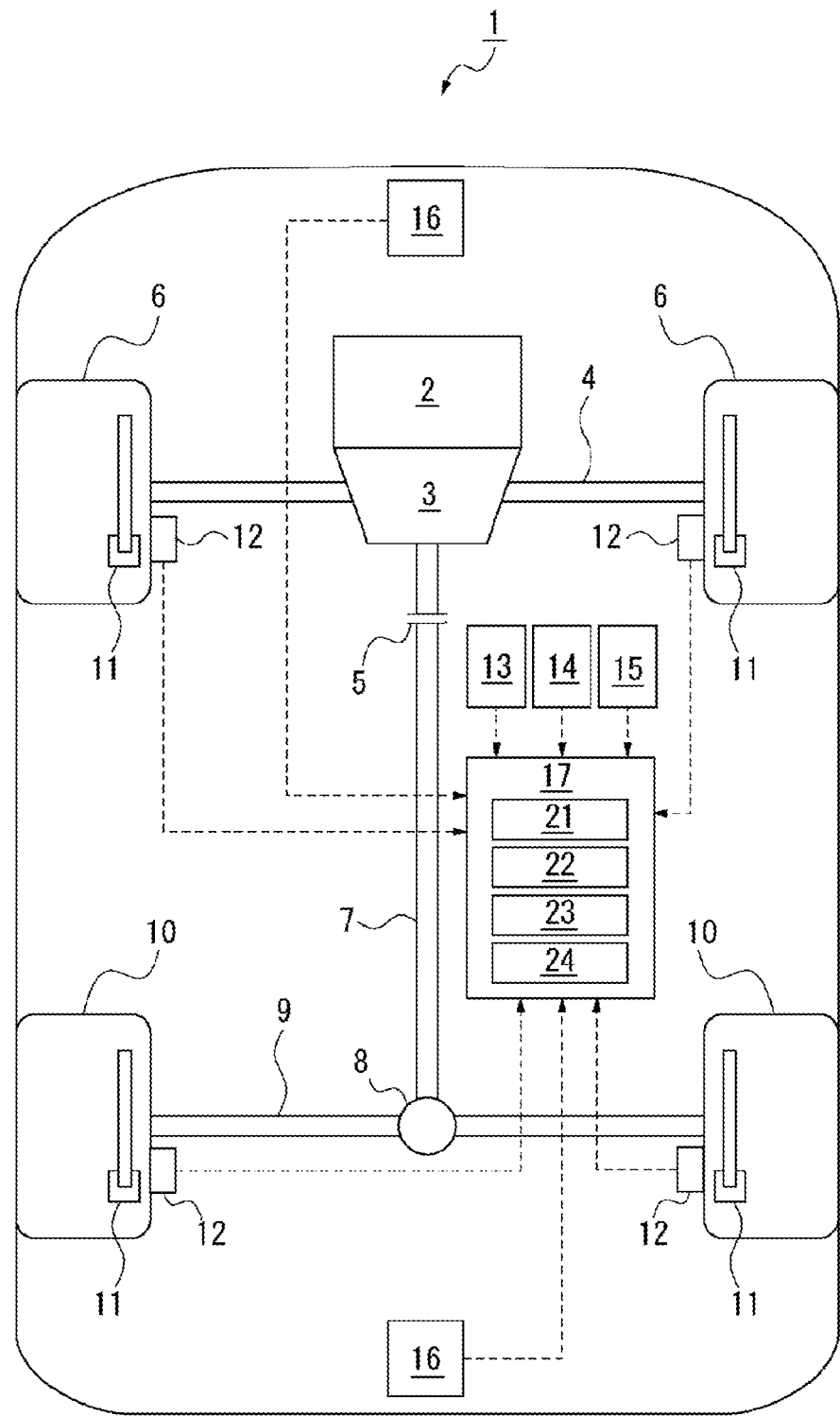
FIG. 1 illustrates a configuration of a vehicle.

FIG. 1 illustrates a configuration of a vehicle 1. The configuration of major components according to the embodiment, among the components in the vehicle 1, is extracted and illustrated in FIG. 1.

As illustrated in FIG. 1, the vehicle 1 includes an engine 2, a transmission 3, a front drive shaft 4, a transfer clutch 5, front wheels 6, a propeller shaft 7, a differential gear 8, a rear drive shaft 9, rear wheels 10, brake devices 11, load sensors 12, a shift sensor 13, an accelerator sensor 14, a brake sensor 15, obstacle sensors 16, and a control unit 17.

The engine 2 is a drive source that generates torque for driving the vehicle 1. The engine 2 consumes fuel, such as gasoline, and rotates an output shaft to generate the torque. Although the vehicle 1 includes the engine 2 as the drive source, the vehicle 1 may include an engine and a motor as the drive sources or may include a motor as the drive source.

The transmission 3 is connected with the output shaft of the engine 2. The transmission 3 is, for example, a non-stage transmission. A primary side of the transmission 3 is connected with the output shaft of the engine 2. A secondary side of the transmission 3 is connected with the front drive shaft 4 and the transfer clutch 5.

The torque output from the engine 2 is input into the primary side of the transmission 3. The transmission 3 converts the torque input into its primary side into torque corresponding to the transmission gear ratio between the primary and the secondary to output the torque resulting from the conversion to the secondary side.

The front drive shaft 4 is connected with the front wheels 6. In other words, part of the torque output from the engine 2 is transmitted to the front wheels 6.

The transfer clutch 5 is provided between the secondary of the transmission 3 and the propeller shaft 7. The propeller shaft 7 is connected to the rear drive shaft 9 via the differential gear 8. The rear drive shaft 9 is connected with the rear wheels 10. The transfer clutch 5 is provided on a transmission path of the torque between the engine 2 and the rear wheels 10.

When the transfer clutch 5 is turned off, the secondary of the transmission 3 is disconnected from the propeller shaft 7 and the torque output from the engine 2 is not transmitted to the rear wheels 10. In contrast, when the transfer clutch 5 is turned on, the secondary of the transmission 3 is connected to the propeller shaft 7 and part of the torque output from the engine 2 is transmitted to the rear wheels 10.

The brake devices 11 are provided in the respective front wheels 6 and the respective rear wheels 10. The brake devices 11 apply braking force to the respective front wheels 6 and the respective rear wheels 10 using oil pressure that is supplied.

The load sensors 12 are provided in wheel hubs connected with the front wheels 6 and the rear wheels 10. The load sensors 12 are, for example, two-shaft load sensors and detect loads in the vertical direction and the front-back direction, which are applied to the wheel hubs (the front wheels 6 and the rear wheels 10).

The shift sensor 13 detects the position of a shift lever (not illustrated). For example, a P range, an N range, a D range, and a B range are provided as the positions of the shift lever. The shift sensor 13 detects which range the shift lever is positioned.

The accelerator sensor 14 detects the amount of operation of an accelerator pedal (not illustrated), that is, the degree of depression thereof. The brake sensor 15 detects the amount of operation of a brake pedal (not illustrated), that is, the degree of depression thereof.

The obstacle sensor 16 is provided at each of the front side and the rear side of the vehicle 1. Each of the obstacle sensors 16 is, for example, an ultrasonic sonar, a radar, a camera, or the like and detects any obstacle in the running direction (the front side or the rear side) of the vehicle 1.

The control unit 17 is a processor including a central processing unit (CPU), a read only memory (ROM), and a random access memory (RAM). For example, the control unit 17 decomposes programs stored in the ROM or a storage (not illustrated) on the RAM and performs a variety of processing (for example, a level-difference override suppression-support control process described below) to control the entire vehicle 1.

For example, the control unit 17 controls the torque output from the engine 2 based on the degree of depression of the accelerator pedal, which is detected by the accelerator sensor 14. The control unit 17 controls the braking force of the brake devices 11 based on the degree of depression of the brake pedal, which is detected by the brake sensor 15.

In addition, the control unit 17 functions as a level difference height calculator 21, an override distance calculator 22, a level difference detector 23, and a running controller 24 when the level-difference override suppression-support control process described in detail below is performed.

The level-difference override suppression-support control process will now be described. Although a case is exemplified in which the rear wheel 10 is in contact with a level difference, a case in which the front wheel 6 is in contact with a level difference is capable of being processed in the same manner.

Figure 2:
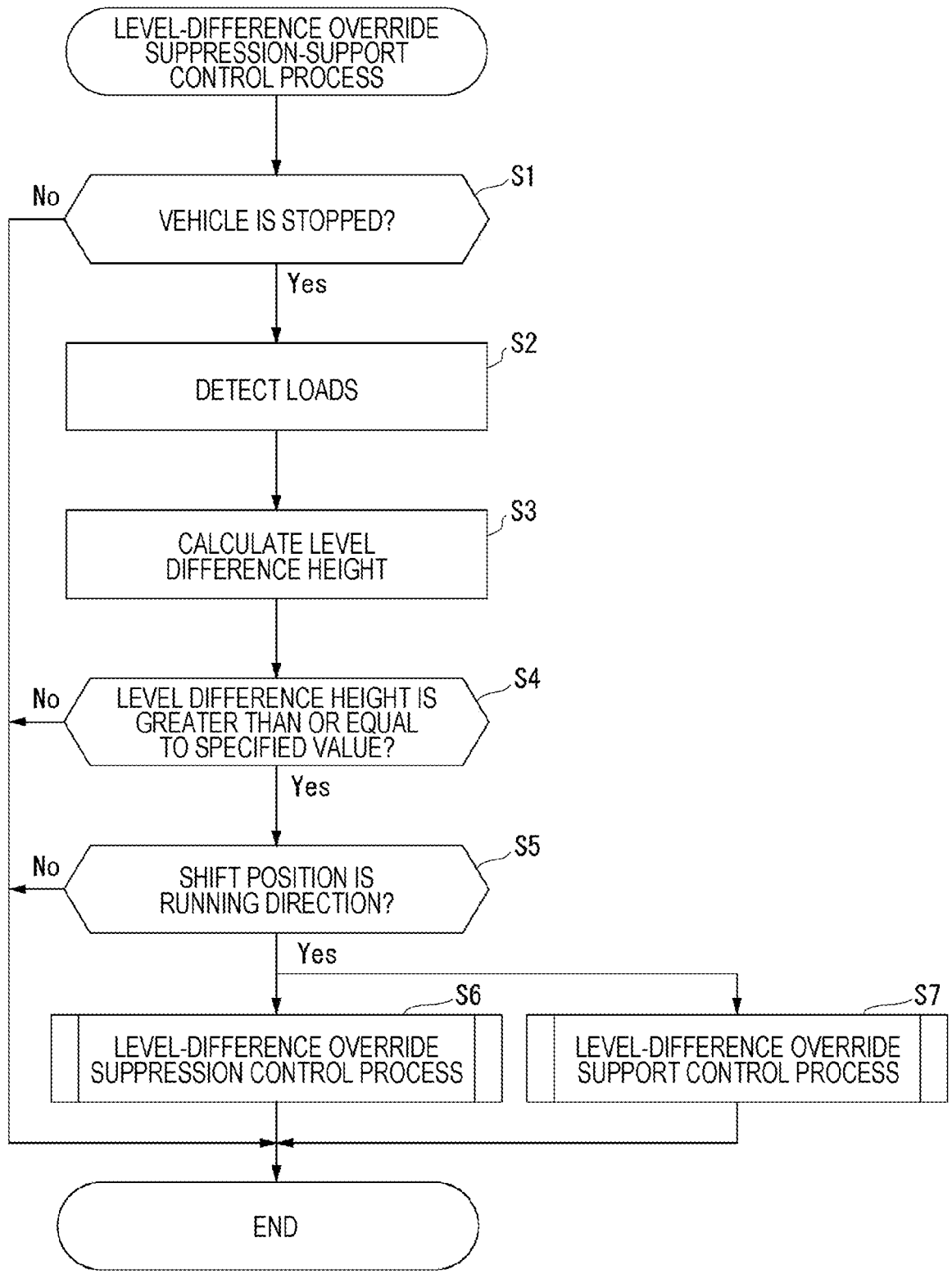
FIG. 2 is a flowchart illustrating a flow of a level-difference override suppression-support control process.

FIG. 2 is a flowchart illustrating a flow of the level-difference override suppression-support control process. Referring to FIG. 2, upon execution of the level-difference override suppression-support control process by the control unit 17, in Step S1, the level difference detector 23 determines whether the vehicle 1 is stopped. Whether the vehicle 1 is stopped may be determined, for example, based on a result of detection by a speed sensor (not illustrated) or based on a result of detection by a rotation speed sensor (not illustrated) provided in each of the front wheels 6 or the rear wheels 10.

If the vehicle 1 is not stopped (NO in Step S1), the level-difference override suppression-support control process is terminated. If the vehicle 1 is stopped (YES in Step S1), in Step S2, the level difference detector 23 acquires the loads in the vertical direction and the front-back direction, which are detected by the load sensor 12.

In Step S3, the level difference height calculator 21 calculates the height of the level difference based on the loads detected by the load sensor 12.

Figure 3:
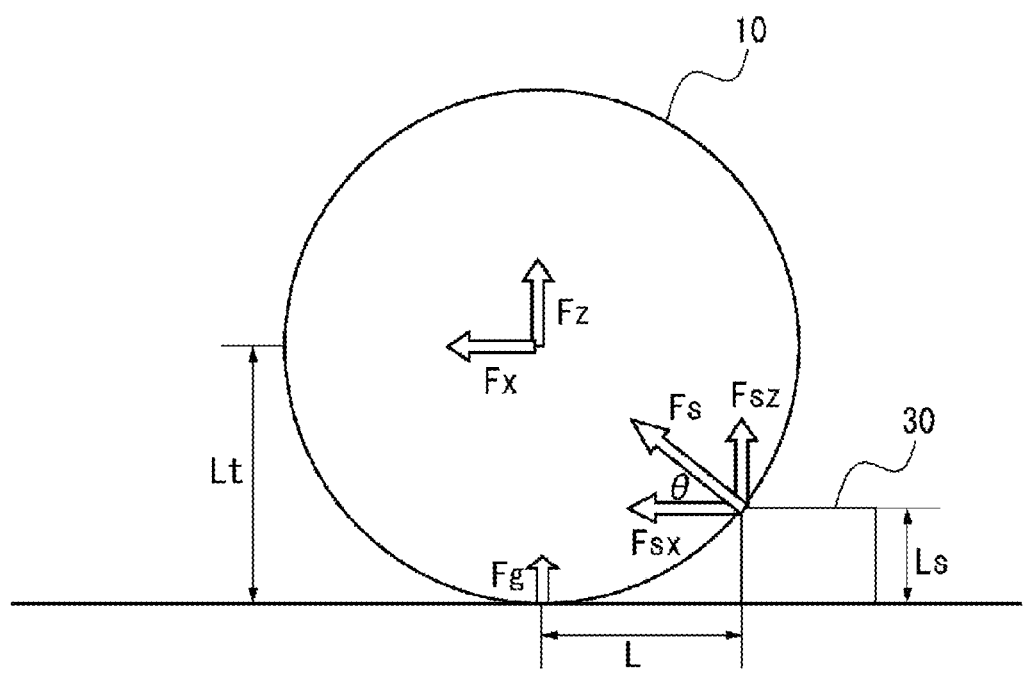
FIG. 3 is a diagram for describing the height of a level difference and an override distance.

FIG. 3 is a diagram for describing the height of a level difference and an override distance. As described above, the load sensors 12 detect the loads in the vertical direction and the front-back direction. The load in the vertical direction, which is detected by the load sensor 12, is hereinafter referred to as load Fz and the load in the front-back direction, which is detected by the load sensor 12, is hereinafter referred to as load Fx, as illustrated in FIG. 3.

When the rear wheel 10 is in contact with a level difference 30, the rear wheel 10 receives contact load Fs from the position where the rear wheel 10 is in contact with the level difference 30 toward the center of the rear wheel 10. In addition, the rear wheel 10 receives vehicle shaft weight Fg caused by the vehicle weight of the vehicle 1. An angle between the contact load Fs and the front-back direction is denoted by θ.

Accordingly, the load Fz in the vertical direction, which is detected by the load sensor 12, is calculated by adding the vehicle shaft weight Fg to load Fsz of the component in the vertical direction of the contact load Fs (the load Fsz is referred to as the load in the Z direction). The load Fx in the front-back direction, which is detected by the load sensor 12, is load Fsx of the component in the front-back direction of the contact load Fs (the load Fsx is referred to as the load in the X direction).

The level difference height calculator 21 calculates a height Ls of the level difference 30 according to Equation (1):

$$Ls = Lt(1 - \sin\theta) \quad (1)$$

In Equation (1), Lt denotes the radius of the rear wheel 10 and is a known value stored in the ROM or the like in advance. The angle θ is calculated according to Equation (2):

$$\theta = (Fz - Fg)/Fx \quad (2)$$

Referring back to FIG. 2, after the height Ls of the level difference 30 is calculated, in Step S4, the running controller 24 determines whether the height Ls of the level difference 30 is greater than or equal to a specified value that is set in advance. In other words, the running controller 24 determines whether level-difference override suppression control and level-difference override support control, which are described below, are to be performed based on the height Ls of the level difference 30. Here, the specified value is set to, for example, a height for detecting whether the level difference 30 is, for example, a wheel stopper, which is provided to stop the vehicle 1. In the vehicle 1, detecting the level difference 30 based on the loads detected by the load sensor 12 in the above manner enables the level difference 30, such as a wheel stopper, immediately beneath the vehicle 1, which is difficult to detect using a camera, a sonar, or the like to be detected.

If the height Ls of the level difference 30 is lower than the specified value (NO in Step S4), that is, if the level difference 30 is sufficiently lower than the wheel stopper or the like and the level-difference override suppression control and the level-difference override support control described below are not to be performed, the level-difference override suppression-support control process is terminated.

If the height Ls of the level difference 30 is greater than or equal to the specified value (YES in Step S4), that is, if the level difference 30 has a height greater than that of the wheel stopper or the like and the level-difference override suppression control and the level-difference override support control described below are to be performed, the flow goes to Step S5.

In Step S5, the running controller 24 determines whether the shift position detected by the shift sensor 13 is in the B range. The running controller 24 determines whether the rear wheel 10 is to move in a direction in which the rear wheel 10 overrides the level difference 30.

If the shift position is not in the B range (NO in Step S5), the level-difference override suppression-support control process is terminated. If the shift position is in the B range (YES in Step S5), the flow goes to Step S6 and Step S7.

In Step S6, the running controller 24 performs a level-difference override suppression control process to suppress erroneous start for override of the level difference 30, in which the vehicle 1 is erroneously started so that the rear wheel 10 overrides the level difference 30. In Step S7, the running controller 24 performs a level-difference override support control process to support override of the level difference 30. In other words, the running controller 24 performs in parallel the level-difference override suppression control to suppress the erroneous start for override of the level difference 30 and the level-difference override support control to support override of the level difference 30.

Figure 4:
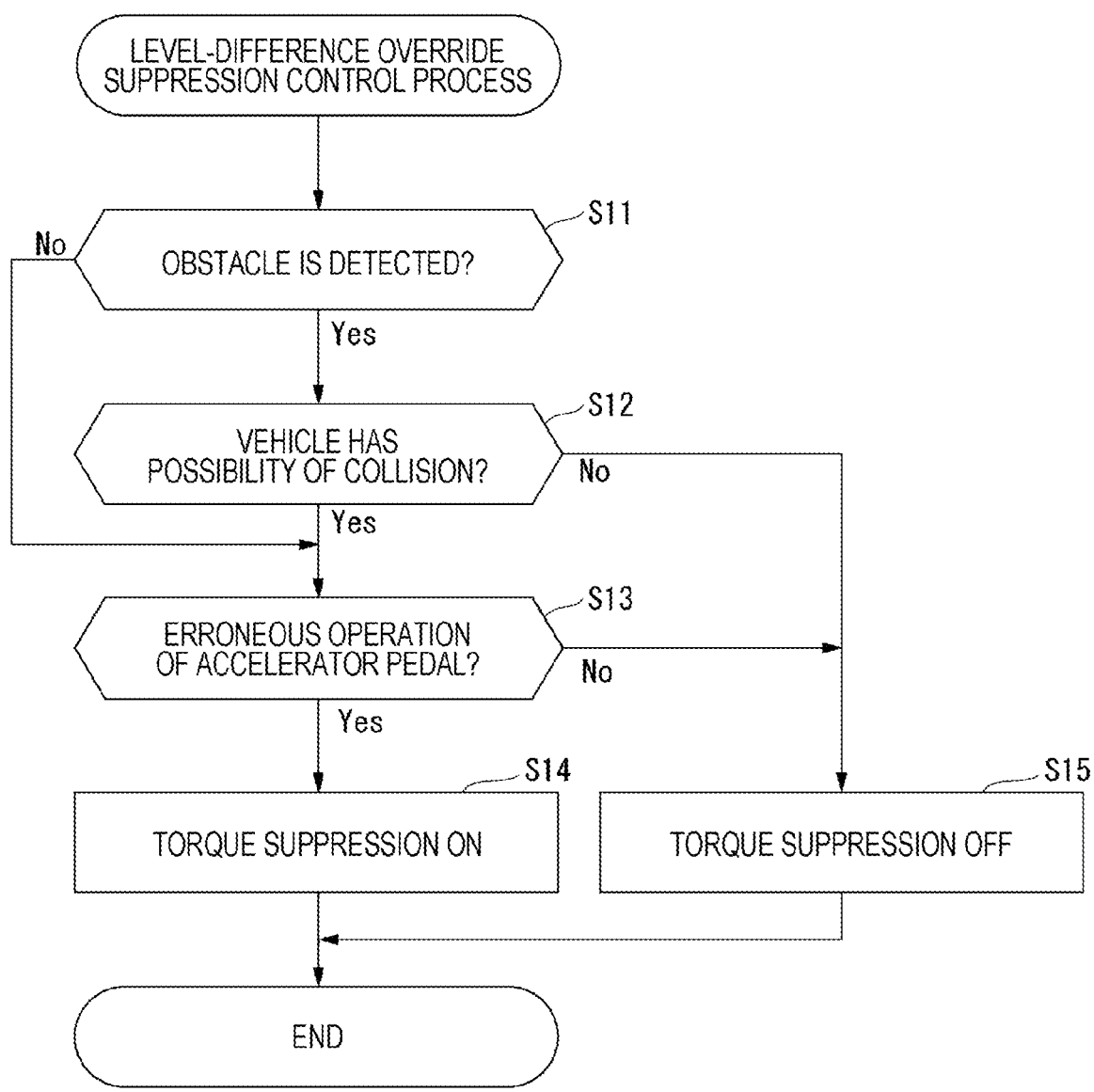
FIG. 4 is a flowchart illustrating a flow of a level-difference override suppression control process.

FIG. 4 is a flowchart illustrating a flow of the level-difference override suppression control process. Referring to FIG. 4, upon start of the level-difference override suppression control process (the level-difference override suppression control), in Step S11, the running controller 24 determines whether any obstacle is detected in the running direction (backward direction) of the vehicle 1 with the obstacle sensor 16, which detects any obstacle in the rear side of the vehicle 1.

If no obstacle is detected in the running direction (backward direction) of the vehicle 1 (NO in Step S11), the flow goes to Step S13. If any obstacle is detected in the running direction (backward direction) of the vehicle 1 (Yes in Step S11), in Step S12, the running controller 24 determines whether the vehicle 1 has a possibility of collision with the detected obstacle. The determination is based on, for example, the distance to the obstacle, which is detected by the obstacle sensor 16 with the obstacle.

If the vehicle 1 has a possibility of collision with the obstacle (YES in Step S12), in Step S13, the running controller 24 determines whether the possibility of an erroneous operation of the accelerator pedal exists based on the degree of depression detected by the accelerator sensor 14. The possibility of an erroneous operation of the accelerator pedal due to rapid depression is determined based on, for example, whether the amount of change of the degree of depression detected by the accelerator sensor 14 is greater than or equal to a predetermined amount.

If the possibility of an erroneous operation of the accelerator pedal exists (YES in Step S13), in Step S14, the running controller 24 suppresses the torque output from the engine 2 (torque suppression ON). Then, the level-difference override suppression-support control process is terminated. As a result, it is possible for the vehicle 1 to prevent the start of the vehicle 1 against the user's intention and to reduce the possibility of collision with the obstacle.

If the vehicle 1 does not have a possibility of collision with the obstacle (NO in Step S12) and if the possibility of an erroneous operation of the accelerator pedal does not exist (NO in Step S13), the running controller 24 determines that the user intends to override the level difference 30 even if the accelerator pedal is operated. In this case, in Step S15, the running controller 24 does not suppress the torque output from the engine 2 (torque suppression OFF). Then, the level-difference override suppression-support control process is terminated. As a result, it is possible to set the vehicle 1 in a state in which the vehicle 1 overrides the level difference 30 in accordance with the user's intention.

Figure 5:
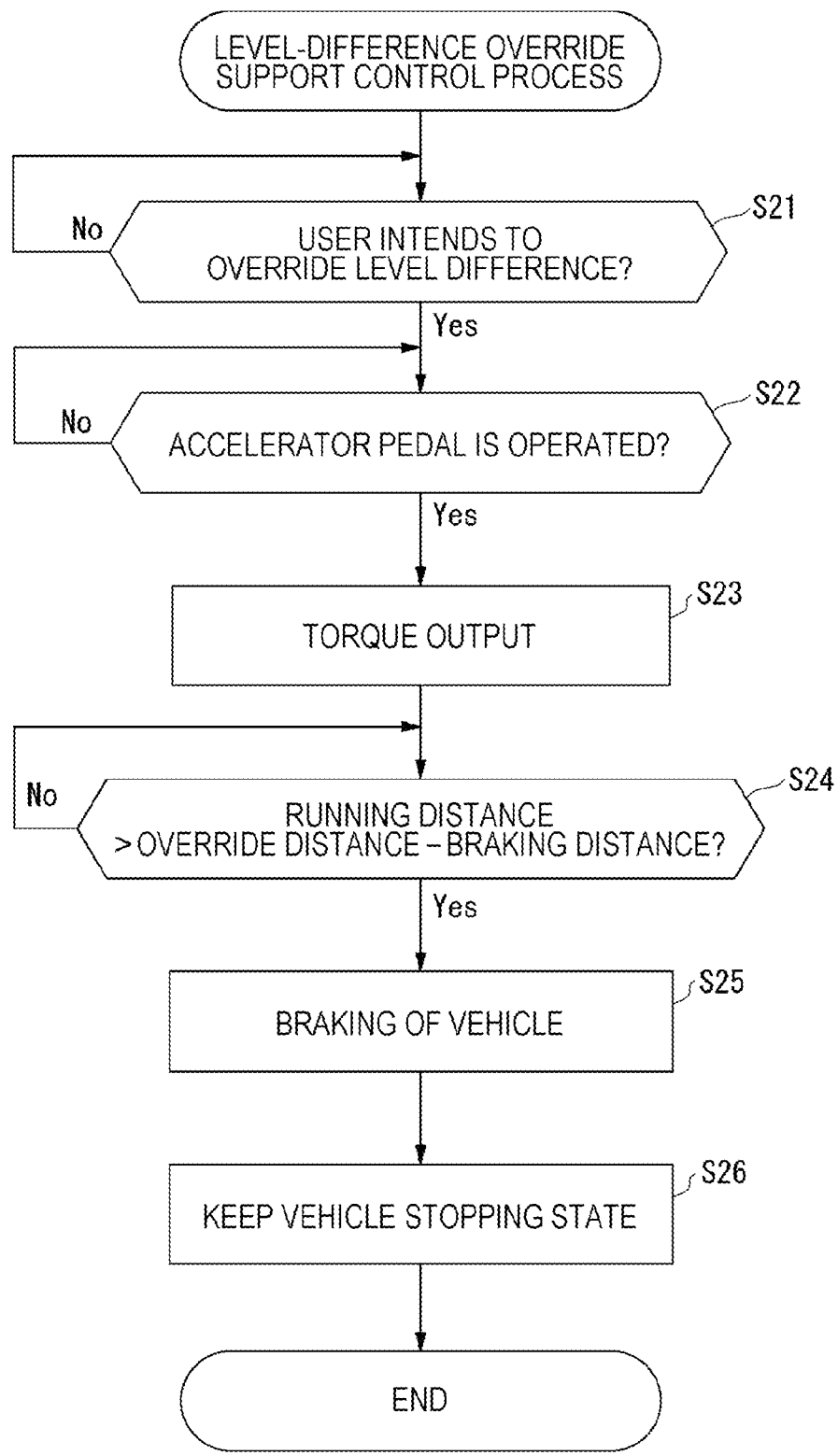
FIG. 5 is a flowchart illustrating a flow of a level-difference override support control process.

FIG. 5 is a flowchart illustrating a flow of the level-difference override support control process. Referring to FIG. 5, upon start of the level-difference override support control process (the level-difference override support control), in Step S21, the running controller 24 determines whether the user intends to override the level difference 30. For example, the running controller 24 displays a message to inquire whether the user intends to override the level difference 30 and determines whether the user intends to override the level difference 30 based on a response operation by the user with an operation unit.

If the running controller 24 determines that the user does not intend to override the level difference 30 (NO in Step S21), Step S21 is repeated until the running controller 24 determines that the user intends to override the level difference 30. If the user intends to override the level difference 30 (YES in Step S21), in Step S22, the running controller 24 determines whether the accelerator pedal is operated based on the degree of depression of the accelerator pedal, which is detected by the accelerator sensor 14.

If the accelerator pedal is not operated (NO in Step S22), Step S22 is repeated until the accelerator pedal is operated. If the accelerator pedal is operated (YES in Step S22), in Step S23, the running controller 24 calculates the torque enabling the override of the level difference 30 and causes the engine 2 to output the calculated torque. As a result, the rear wheel 10 starts to override the level difference 30.

In Step S24, the running controller 24 determines whether a running distance since the vehicle 1 has been in contact with the level difference 30 is greater than a value calculated by subtracting a predetermined braking distance from the override distance. Here, the override distance calculator 22 calculates the distance in the front-back direction from the center of the rear wheel 10 to the side closest to the rear wheel 10 of the level difference 30, that is, the moving distance to override the level difference 30 as an override distance L (refer to FIG. 3) according to Equation (3) when the level difference 30 is detected:

$$L=\sqrt{Lt^2-(Lt-Ls)^2} \quad (3)$$

In addition, the running controller 24 calculates the distance in the front-back direction since the oil pressure is supplied to the brake device 11 until the vehicle 1 is stopped as a braking distance based on the current vehicle speed, the torque of the engine 2, various factors of the brake device 11, and so on. Furthermore, the running controller 24 calculates the running distance based on, for example, a result of detection of the rotation speed sensor provided in the rear wheel 10 and the radius Lt of the rear wheel 10. The method of calculating the running distance, the override distance, and the braking distance are not limited to the above ones and may be calculated using another method.

If the running distance is not greater than the value calculated by subtracting the braking distance from the override distance (NO in Step S24), Step S24 is repeated until the running distance is made greater than the value calculated by subtracting the braking distance from the override distance.

If the running distance is greater than the value calculated by subtracting the braking distance from the override distance (YES in Step S24), in Step S25, the running controller 24 starts braking to cause the rear wheel 10 to override the level difference 30 to immediately stop the vehicle 1. In one example, the running controller 24 suppresses the torque output from the engine 2 and supplies the oil pressure to the brake device 11 to cause the brake device 11 to exert the braking force.

Then, when the vehicle 1 is stopped, in Step S26, the running controller 24 performs control so as to keep a state in which the vehicle 1 is stopped. Then, the level-difference override suppression-support control process is terminated. As a result, it is possible for the vehicle 1 to support override of the level difference 30 and to reduce overrun caused by the override of the level difference 30.

As described above, the vehicle 1 according to the present embodiment includes the level difference detector 23 that detects the level difference and the running controller 24 that performs in parallel the level-difference override suppression control to suppress erroneous start for override of the level difference and the level-difference override support control to support override of the level difference.

With the above configuration, the vehicle 1 is capable of supporting the override of the level difference 30 if the user intends to override the level difference 30 and is capable of suppression so that the vehicle 1 does not override the level difference 30 if the user does not intend to override of the level difference 30, for example, in the case of an erroneous operation.

Accordingly, the vehicle 1 is capable of performing control in which a user's operation is reflected against the level difference 30 and improving the safety and the usability.

The vehicle 1 may further include the load sensor 12 that detects the load when the wheel (the front wheel 6 or the rear wheel 10) is in contact with the level difference 30 and the level difference height calculator 21 that calculates the height of the level difference 30 based on the load detected by the load sensor 12. The running controller 24 determines whether the level-difference override suppression control and the level-difference override support control are to be performed based on the height of the level difference 30.

With the above configuration, the vehicle 1 is capable of reducing the processing load without performing the controls if the level difference 30 is sufficiently lower than a wheel stopper or the like and the level-difference override suppression control and the level-difference override support control are not to be performed. The vehicle 1 is capable of reducing a feeling of strangeness of the user, caused by the processes performed for the sufficiently low level difference 30.

The vehicle 1 may further include the load sensor 12 that detects the load when the wheel is in contact with the level difference 30 and the override distance calculator 22 that calculates the override distance, which is the moving distance to override the level difference 30, based on the load detected by the load sensor 12. The running controller 24 performs suppression of the torque from the drive source and increase of brake pressure of the brake device if the running distance since the vehicle 1 has been in contact with the level difference 30 is greater than the value calculated by subtracting a predetermined braking distance from the override distance in the level-difference override support control.

With the above configuration, the vehicle 1 is capable of reducing the overrun caused by the override of the level difference 30.

The vehicle 1 may further include the obstacle sensor 16 that detects any obstacle in the running direction and the accelerator sensor 14 that detects the degree of depression of the accelerator pedal. The running controller 24 performs suppression of the torque from the drive source (the engine 2) if any obstacle is detected and if the amount of change of the degree of depression is greater than or equal to a predetermined amount in the level-difference override suppression control.

With the above configuration, the vehicle 1 is capable of reducing the possibility of collision with the obstacle.

The vehicle 1 may further include the shift sensor 13 that detects the shift position. The running controller 24 performs the level-difference override suppression control and the level-difference override support control if the running direction of the vehicle 1 based on the shift position is the direction toward the level difference 30.

With the above configuration, the vehicle 1 is capable of reducing the processing load without performing the controls if the vehicle 1 does not move to the level difference 30.

Although the embodiments of the disclosure are described above, the disclosure is not limited to specific examples described above and may have various configurations.

For example, the specific contents of the level-difference override suppression control and the level-difference override support control may not be the ones described above in the vehicle 1. For example, it is sufficient for the level-difference override suppression control to suppress the erroneous start for override of the level difference 30 and it is sufficient for the level-difference override support control to support override of the level difference.

Although the level difference 30 is detected based on the result of detection by the load sensor 12 in the above embodiments, the level difference 30 may be detected using another method, such as a camera or a radar.

The control unit 17 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control unit 17 including level difference height calculator 21, the override distance calculator 22, the level difference detector 23, and the running controller 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle comprising:
   at least one processor;
   at least one machine readable tangible medium storing instructions that, when read by the at least one processor, cause the at least one processor to:
   detect a level difference; and
   perform in parallel level-difference override suppression control to suppress erroneous start for override of the level difference and level-difference override support control to support override of the level difference; and a load sensor configured to detect a load when a wheel of the vehicle is in contact with the level difference, wherein the instructions, when read by the at least one processor, cause the at least one processor to calculate an override distance based on the load detected by the load sensor, the override distance being a distance by which the vehicle is to move to override the level difference, and in the level-difference override support control, the at least one processor performs suppression of torque from a drive source of the vehicle and increase of brake pressure of a brake device of the vehicle in a case where a distance by which the vehicle moves since the vehicle has been in contact with the level difference is greater than a value calculated by subtracting a predetermined braking distance from the override distance.

2. The vehicle according to claim 1, wherein the instructions, when read by the at least one processor, cause the at least one processor to:

calculate a height of the level difference based on the load detected by the load sensor, and determine whether to perform the level-difference override suppression control and the level-difference override support control based on the height of the level difference.

3. The vehicle according to claim 2, further comprising:

an obstacle sensor configured to detect any obstacle in a running direction of the vehicle; and an accelerator sensor configured to detect a degree of depression of an accelerator pedal of the vehicle, wherein, in the level-difference override suppression control, the at least one processor performs suppression of torque from a drive source of the vehicle in a case where any obstacle is detected and in a case where an amount of change of the degree of the depression is greater than or equal to a predetermined amount.

4. The vehicle according to claim 3, further comprising:

a shift sensor configured to detect a shift position, wherein, in a case where the running direction of the vehicle is determined, based on the shift position, to be a direction toward the level difference, the at least one processor performs the level-difference override suppression control and the level-difference override support control.

5. The vehicle according to claim 2, further comprising:

a shift sensor configured to detect a shift position, wherein, in a case where a running direction of the vehicle is determined, based on the shift position, to be a direction toward the level difference, the at least one processor performs the level-difference override suppression control and the level-difference override support control.

6. The vehicle according to claim 1, further comprising:

an obstacle sensor configured to detect any obstacle in a running direction of the vehicle; and an accelerator sensor configured to detect a degree of depression of an accelerator pedal of the vehicle, wherein, in the level-difference override suppression control, the at least one processor performs suppression of torque from a drive source of the vehicle in a case where any obstacle is detected and in a case where an amount of change of the degree of the depression is greater than or equal to a predetermined amount.

7. The vehicle according to claim 6, further comprising:

a shift sensor configured to detect a shift position, wherein, in a case where the running direction of the vehicle is determined, based on the shift position, to be a direction toward the level difference, the at least one processor performs the level-difference override suppression control and the level-difference override support control.

8. The vehicle according to claim 1, further comprising:

a shift sensor configured to detect a shift position, wherein, in a case where a running direction of the vehicle is determined, based on the shift position, to be a direction toward the level difference, the at least one processor performs the level-difference override suppression control and the level-difference override support control.

9. A vehicle comprising:

circuitry configured to:

detect a level difference, and perform in parallel level-difference override suppression control to suppress erroneous start for override of the level difference and level-difference override support control to support override of the level difference; and a load sensor configured to detect a load when a wheel of the vehicle is in contact with the level difference, wherein the circuitry is configured to calculate an override distance based on the load detected by the load sensor, the override distance being a distance by which the vehicle is to move to override the level difference, and in the level-difference override support control, the circuitry performs suppression of torque from a drive source of the vehicle and increase of brake pressure of a brake device of the vehicle in a case where a distance by which the vehicle moves since the vehicle has been in contact with the level difference is greater than a value calculated by subtracting a predetermined braking distance from the override distance.

10. The vehicle according to claim 9, wherein the circuitry is configured to:

calculate a height of the level difference based on the load detected by the load sensor, and determine whether to perform the level-difference override suppression control and the level-difference override support control based on the height of the level difference.

11. The vehicle according to claim 9, further comprising:

an obstacle sensor configured to detect any obstacle in a running direction of the vehicle; and an accelerator sensor configured to detect a degree of depression of an accelerator pedal of the vehicle, wherein, in the level-difference override suppression control, the circuitry performs suppression of torque from a drive source of the vehicle in a case where any obstacle is detected and in a case where an amount of change of the degree of the depression is greater than or equal to a predetermined amount.

12. The vehicle according to claim 9, further comprising:

a shift sensor configured to detect a shift position, wherein, in a case where a running direction of the vehicle is determined, based on the shift position, to be a direction toward the level difference, the circuitry performs the level-difference override suppression control and the level-difference override support control.

13. A vehicle comprising:

at least one processor;

at least one machine readable tangible medium storing instructions that, when read by the at least one processor, cause the at least one processor to:

detect a level difference; and perform in parallel level-difference override suppression control to suppress erroneous start for override of the level difference and level-difference override support control to support override of the level difference;

an obstacle sensor configured to detect any obstacle in a running direction of the vehicle; and an accelerator sensor configured to detect a degree of depression of an accelerator pedal of the vehicle, wherein, in the level-difference override suppression control, the at least one processor performs suppression of torque from a drive source of the vehicle in a case where any obstacle is detected and in a case where an amount of change of the degree of the depression is greater than or equal to a predetermined amount.

14. The vehicle according to claim 13, further comprising:
a load sensor configured to detect a load when a wheel of the vehicle is in contact with the level difference,
wherein the instructions, when read by the at least one processor, cause the at least one processor to:
calculate a height of the level difference based on the load detected by the load sensor, and
determine whether to perform the level-difference override suppression control and the level-difference override support control based on the height of the level difference.

15. The vehicle according to claim 13, further comprising:
a load sensor configured to detect a load when a wheel of the vehicle is in contact with the level difference,
wherein
the instructions, when read by the at least one processor, cause the at least one processor to calculate an override distance based on the load detected by the load sensor, the override distance being a distance by which the vehicle is to move to override the level difference, and
in the level-difference override support control, the at least one processor performs suppression of torque from a drive source of the vehicle and increase of brake pressure of a brake device of the vehicle in a case where a distance by which the vehicle moves since the vehicle has been in contact with the level difference is greater than a value calculated by subtracting a predetermined braking distance from the override distance.

16. The vehicle according to claim 13, further comprising:
a shift sensor configured to detect a shift position,
wherein, in a case where a running direction of the vehicle is determined, based on the shift position, to be a direction toward the level difference, the at least one processor performs the level-difference override suppression control and the level-difference override support control.

* * * * *